(12) United States Patent
Liu

(10) Patent No.: US 7,259,531 B1
(45) Date of Patent: Aug. 21, 2007

(54) SPEED CONTROL OF BRUSHLESS DC MOTORS

(76) Inventor: Kwang-Hwa Liu, 714 Jura Way, Sunnyvale, CA (US) 94087

( * ) Notice: Subject to any disclaimer, the term of this patent is extended or adjusted under 35 U.S.C. 154(b) by 0 days.

(21) Appl. No.: 11/397,800

(22) Filed: Apr. 5, 2006

(51) Int. Cl.
*H02P 1/18* (2006.01)
(52) U.S. Cl. .................. 318/254; 318/138; 318/439; 388/800; 388/806; 388/911
(58) Field of Classification Search ............. 318/138, 318/254, 439, 461; 388/800, 806, 815, 911
See application file for complete search history.

(56) References Cited

U.S. PATENT DOCUMENTS 5,534,763 A * 7/1996 Williams et al. ............ 318/799
5,821,708 A * 10/1998 Williams et al. ............ 318/254
6,285,146 B1 * 9/2001 Harlan ....................... 318/254

* cited by examiner

*Primary Examiner*—Rina Duda
(74) *Attorney, Agent, or Firm*—Birch, Stewart, Kolasch & Birch, LLP

(57) ABSTRACT

The speed control apparatus comprises a plurality of Hall sensors, a plurality of switches, a turn-on control circuit, and a gate drive logic. The Hall sensors are configured to detect magnetic rotor sections of a poly-phase brushless DC motor at different positions. The switches apply voltages on a plurality of windings to respectively produce magnetic north or south on stator poles of the poly-phase BLDC motor. The turn-on control circuit generates a conduction time reduction after each output transition of the Hall sensors. The gate drive logic separately turns on or turns off the switches according to different output transitions of the Hall sensors to respectively apply voltages on the windings with the conduction time reduction.

23 Claims, 14 Drawing Sheets

SPEED CONTROL OF BRUSHLESS DC MOTORS

BACKGROUND

1. Field of Invention

The present invention relates to brushless DC motors. More particularly, the present invention relates to an apparatus for controlling the speed of the brushless DC motor.

2. Description of Related Art

Brushless DC (BLDC) motors using permanent magnets are simple in design and rugged in structure. The BLDC motor omits the cumbersome and unreliable commutator and brush structure of the conventional DC motor. A dual-phase and 4-pole design of the BLDC motor is especially popular for low-power (less than 100 W) applications. If the performance and speed control of the BLDC motors keeps improving, the BLDC motors have potential to be prevalent in home appliances, air-conditioning, and machine tools, replacing induction motors and brush DC motors.

A 4-pole BLDC motor requires only one low-cost Hall sensor to operate the motor properly. FIG. 1 illustrates a schematic view of a typical 2-coil, 4-pole BLDC motor design. The armature (coil assembly) is mounted on stator 102, which has 4 poles, P1, P2, P3 and P4. Both coil 1 and coil 2 are wound on all four poles P1, P2, P3 and P4 in a bifilar fashion. Rotor 104 is made of four sections of permanent magnet (N1, S1, N2, S2) joined together. Hall sensor (HS) 106 is mounted on stator 102 between the poles P1 and P2 to sense the sectional position of rotor 104.

Hall sensor 106, which is slightly shifted toward pole P1, sends out a logic High signal (representing a high logic level) when it detects a positive magnetic flux coming into its sensing surface. Contrarily, when Hall sensor 106 detects a negative magnetic flux or no flux at all, it sends out a logic Low signal (representing a low logic level). It is noted that as a convention, positive magnetic fluxes leave from a north pole and return to a south pole.

Control circuit 108 comprises base drive circuits for driving power transistors Q1 and Q2. When control circuit 108 receives a logic High signal from Hall sensor 106, power transistor Q1 is turned on and power transistor Q2 is turned off, and thus the current flows through the first coil (Coil 1). The current of Coil 1 flows from Vin, sequentially through the poles P4, P3, P2, P1, and returns to the ground via power transistor Q1, creating outgoing magnetic fluxes on the surface of poles P1 and P3. These outgoing magnetic fluxes return to the surface of poles P2 and P4.

In other words, the current flowing through Coil 1 turns the poles P1 and P3 into north poles and turns the poles P2 and P4 into south poles. North pole P1 repels the section N1 and attracts the section S1 of rotor 104, causing rotor 104 to spin clockwise. South pole P2 repels the section S2 and attracts the section N1 of rotor 104, causing rotor 104 to spin clockwise as well. Likewise, poles P3 and P4 all act to coerce rotor 104 to spin clockwise. The mechanical force (shaft torque) developed will continue to spin rotor 104 clockwise until the section N1 is completely positioned under pole P2, and the section S1 is completely positioned under pole P1 and so on. By that time, Hall sensor 106 has engaged with the right edge of the section S1 and detects a negative flux, outputting a logic Low signal. Control circuit 108 turns off power transistor Q1 and turns on power transistor Q2 according to the logic Low signal, and then Coil 2 conducts current.

The current of Coil 2 now flows from Vin, sequentially through the poles P1, P2, P3, P4, and returns to the ground via power transistor Q2. The current flowing through Coil 2 is in a reverse direction from the situation when Coil 1 conducts current. At this moment, poles P1 and P3 become south poles, and poles P2 and P4 become north poles. Pole P1 repels the section S1 and attracts the section N2 of rotor 104; pole P2 repels the section N1 and attracts the section S1 of rotor 104, and so on. This keeps rotor 104 spinning in the clockwise direction.

FIG. 2 is a circuit diagram of a single-coil BLDC motor, which uses a full-bridge circuit to drive the motor. The full-bridge circuit comprises four power transistors Q1, Q2, Q3, and Q4. A stator of the motor has only one coil, which is wound on all four stator poles P1, P2, P3, and P4. A Hall sensor (HS) 206 is similarly mounted between poles P1 and P2. When Hall sensor 206 detects a positive magnetic flux, Hall sensor 206 sends out a logic High signal to control circuit 208, directing it to turn off power transistors Q2 and Q3, and then turn on power transistors Q1 and Q4 after a slight delay. This applies a current through the single coil, flowing from Vin, sequentially through power transistor Q1, and poles P4, P1, P2, P3, and returning to the ground via power transistor Q4. The current flowing in this direction turns the vertical poles (P1 and P3) into north poles, and turns the horizontal poles (P2 and P4) into south poles. The magnetic motive force developed on those four poles P1, P2, P3, and P4 coerces the rotor to spin clockwise.

When magnetic rotor section N1 revolves to be completely under pole P2, Hall sensor 206 engages with the right edge of magnetic rotor section S1 and detects a negative magnetic flux. Control circuit 208 receives a logic Low signal from Hall sensor 206 and thus turns off power transistors Q1 and Q4, and turns on power transistors Q2 and Q3. The full-bridge circuit now applies a current through the coil, flowing from Vin, sequentially through power transistor Q2, poles P3, P2, P1, P4, and returning to the ground via power transistor Q3. The current flowing in this direction turns the vertical poles (P1 and P3) into south poles, and turns the horizontal poles (P2 and P4) into north poles. This keeps the rotor spinning clockwise. Accordingly, the overall operation of this full-bridge circuit driving a single-coil motor is very similar to the two-transistor control circuit in FIG. 1 driving a 2-coil motor.

FIG. 3 is a circuit diagram of a conventional BLDC motor with speed control, which uses a linear regulator to control the input voltage of the BLDC motor. As illustrated in FIG. 3, linear regulator 312 with an adjustable output voltage is connected in between a 12V power source (Vsupply) and an input voltage (Vin) to the motor drive circuit, which comprises two power transistors, Q1 and Q2. A variable resistor VR adjusts the input voltage Vin to run the motor.

In general, the input power (Pin) is proportional to Vin*Iin, where Iin is the input current. On the other hand, the output power delivered to the motor load, Pout, is equal to the product of shaft torque and rotating speed as follows:

$$Pout = torque*speed = Pin*efficiency$$

However, for a given Vin, as the rotating speed of the motor increases, the permanent magnetic sectors of the rotor will induce a counter electromotive force (EMF) on the stator windings. The faster the motor spins, the higher magnitude of counter EMF it produces. Therefore, both input current and input power decrease in proportion to the rotating speed of the motor. For a given Vin, the output power as well as the output torque decrease as the rotating speed of the motor increases.

FIG. 4 is a diagram of the shaft torque lines versus rotating speed at different input voltage levels of 12V, 10V, and 8V, of the motor in FIG. 3. It also illustrates a load torque curve of this motor driving a cooling fan. The cooling fan is basically a friction load, and the faster the fan spins, the higher torque it requires. The final rotating speed of the motor is determined by the point where the shaft torque line intersects with the load torque curve. As illustrated in FIG. 4, at 12V input voltage, the fan speed is to be at 1900 RPM; at 10V input voltage, the fan speed is reduced to 1300 RPM; and at 8V input voltage, the fan speed is reduced to 680 RPM. The main drawback of this conventional motor with a linear regulator is very poor efficiency in that the linear regulator tends to dissipate significant power loss.

FIG. 5 is a circuit diagram of another conventional BLDC motor with speed control, which applies a pulse-width modulation (PWM) to the base drive current. As illustrated in FIG. 5, the conduction time (Ton) of power transistor Q1 or Q2 is now reduced by an amount proportional to (1−D), where D is the duty cycle. A PWM speed control is equivalent to controlling the conduction time of the motor's driving current. For example, by setting the duty at 0.7, the input current as well as the input power are reduced by 30% from their value at full duty.

FIG. 6 is a diagram of the torque curves versus the rotating speed at different duty cycle values of 1.0, 0.7, and 0.5, of the motor in FIG. 5. The motor runs at 2050 RPM at full duty; the speed of the motor is reduced to 1620 RPM at duty cycle of 0.7; and the speed of the motor is reduced to 1150 RPM at duty cycle of 0.5.

FIG. 7 illustrates the PWM control scheme waveforms of the motor in FIG. 6. FIG. 7(A) illustrates the Hall sensor output; FIG. 7(B) is the base drive current waveform of power transistor Q1 before a PWM is applied; FIG. 7(C) is the base drive current waveform of power transistor Q2 before a PWM is applied; FIG. 7(D) illustrates the torque at full duty. FIG. 7(E) illustrates the base drive current waveform of power transistor Q1 after a PWM is applied; FIG. 7(F) illustrates the base drive current waveform of power transistor Q2 after a PWM is applied; FIG. 7(G) illustrates the torque when the PWM duty is at 0.7 (from T0 to T1), and when the PWM duty is at 0.5 (from T2 to T4).

However, the conventional motor with PWM speed control has some drawbacks. If the duty is set too short, for example, 0.5 or lower, the motor will have a low starting torque such that the motor may not start properly with a pre-applied heavy load. In a situation when the load of the motor fluctuates wildly, such as in a power drill, a sudden application of a heavy load may cause the motor to stall. As illustrated in FIG. 6, the light load torque curve (as the power drill drives into a soft wood) intersects the 50% duty line at 1150 RPM (S3). If the power drill encounters a piece of metal, the load suddenly increases to the heavy load torque curve. Because the shaft torque is smaller than what the actual load demands, the motor will quickly decelerate. But since the new load torque curve (the heavy load torque curve) does not intersect with the 50% duty line, the motor will stall if the control circuit cannot react in time.

Unfortunately, the Hall sensor will send out exactly 4 step signals (rising and falling edges) per mechanical revolution. For example, when the rotating speed is at 120 RPM, the Hall sensor only toggles 8 times per second. The dilemma is, before an impending stall, the rotating speed of the motor quickly decelerates, but the interval for the Hall sensor to regularly send out the step signal becomes longer. In extreme cases, a motor encountering a sudden load increase may stall so abruptly that the last signal from the Hall sensor for the control circuit to determine a motor stall never happens.

Moreover, if the applied PWM frequency is too low (<20 kHz), there will be audible switching noise. On the other hand, if the applying PWM frequency is too high (>20 kHz), there will be extra conduction loss (because the coil's AC resistance is significantly higher at >20 kHz) and higher core loss (because the eddy current loss due to the flux density changes at the higher frequency).

SUMMARY

It is therefore an objective of the present invention to provide an apparatus for controlling the speed of a brushless DC motor, which has a good open-loop speed regulation, and makes the motor running at low speed not stall even if a full load is suddenly applied to it. Moreover, by the apparatus for controlling the speed of a brushless DC motor, the degradation of the starting torque can be eliminated, the high-frequency PWM and associated noise can be mitigated, and the conduction loss or core loss also does not increase.

According to one preferred embodiment of the present invention, the apparatus comprises a Hall sensor, a first switch, a second switch, and a turn-on control circuit. The Hall sensor outputs a high logic level when the Hall sensor detects a proximity of a magnetic north rotor section of the brushless DC motor, and outputs a low logic level when the Hall sensor detects a proximity of a magnetic south rotor section of the brushless DC motor. The first switch applies voltage on a first winding to produce magnetic north on vertical stator poles of the brushless DC motor and magnetic south on horizontal stator poles of the brushless DC motor. The second switch applies voltage on a second winding to produce magnetic south on the vertical stator poles and magnetic north on the horizontal stator poles.

The turn-on control circuit generates a conduction time reduction after each output transition of the Hall sensor. When the output transition of the Hall sensor is from the low logic level to the high logic level, the first switch is turned on to apply voltage on the first phase winding with a turn-on delay of the conduction time, a turn-off advance of the conduction time, or a combination of turn-on delay and turn-off advance of the conduction time. When the output transition of the Hall sensor is from the high logic level to the low logic level, the second switch is turned on to apply voltage on the second phase winding with the turn-on delay of the conduction time, the turn-off advance of the conduction time, or the combination of turn-on delay and turn-off advance of the conduction time.

According to another preferred embodiment of the present invention, the brushless DC motor has a rotor disposed within vertical stator poles and horizontal stator poles. The apparatus comprises a Hall sensor, a first switch, a second switch, and a turn-on control circuit. The Hall sensor detects a magnetic rotor section of the rotor. The first switch produces magnetic north on the vertical stator poles and magnetic south on the horizontal stator poles. The second switch produces magnetic south on the vertical stator poles and magnetic north on the horizontal stator poles.

The turn-on control circuit comprises a voltage ramp circuit and a comparator, and is used for generating a conduction time reduction after each output transition of the Hall sensor. The voltage ramp circuit is triggered to generate a ramp voltage by each output transition of the Hall sensor from a low logic level to a high logic level or from the high logic level to the low logic level. A non-inverting input of the comparator is electrically connected to the ramp voltage, and an inverting input of the comparator is electrically connected to a reference voltage. When the ramp voltage exceeds the reference voltage, the comparator generates the conduction time reduction for alternately switching the first switch and the second switch.

According to another preferred embodiment of the present invention, the brushless DC motor has a rotor disposed within vertical stator poles and horizontal stator poles. The apparatus comprises a Hall sensor, a first switch, a second switch, and a turn-on control circuit. The Hall sensor detects a magnetic rotor section of the rotor. The first switch produces magnetic north on the vertical stator poles and magnetic south on the horizontal stator poles. The second switch produces magnetic south on the vertical stator poles and magnetic north on the horizontal stator poles.

The turn-on control circuit comprises a phase lock loop circuit, a voltage ramp circuit and a comparator, and is used to generate a conduction time reduction after each output transition of the Hall sensor. A non-inverting input of the phase lock loop circuit is electrically connected to an output of the Hall sensor, and an inverting input of the phase lock loop circuit is electrically connected to a speed-setting reference voltage. The voltage ramp circuit is triggered to generate a ramp voltage by each output transition of the Hall sensor from a low logic level to a high logic level or from the high logic level to the low logic level. An inverting input of the comparator is electrically connected to the ramp voltage, and a non-inverting input of the comparator is electrically connected to an output of the phase lock loop circuit. The comparator produces the conduction time reduction in proportion to a difference between an actual speed of the motor and a reference speed set by the speed-setting reference voltage.

According to another preferred embodiment of the present invention, the apparatus comprises a plurality of Hall sensors, a plurality of switches, a turn-on control circuit, and a gate drive logic. The Hall sensors are configured to detect magnetic rotor sections of a poly-phase brushless DC motor by different positions. The switches apply voltages on a plurality of windings to respectively produce magnetic north or south on stator poles of the poly-phase BLDC motor. The turn-on control circuit generates a conduction time reduction after each output transition of the Hall sensors. The gate drive logic separately turns on or turns off the switches according to different output transitions of the Hall sensors to respectively apply voltages on the windings with a turn-on delay of the conduction time, a turn-off advance of the conduction time, or a combination of turn-on delay and turn-off advance of the conduction time.

It is to be understood that both the foregoing general description and the following detailed description are examples and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
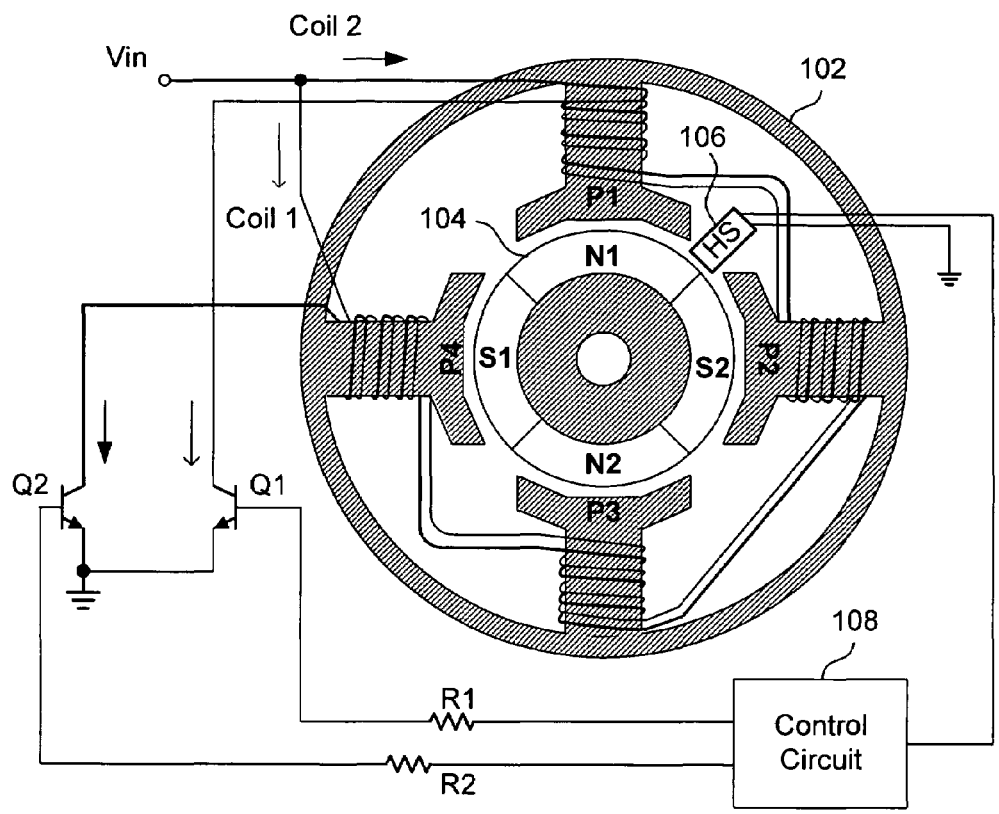
FIG. 1 illustrates a schematic view of a typical 2-coil, 4-pole BLDC motor design.
Figure 2:
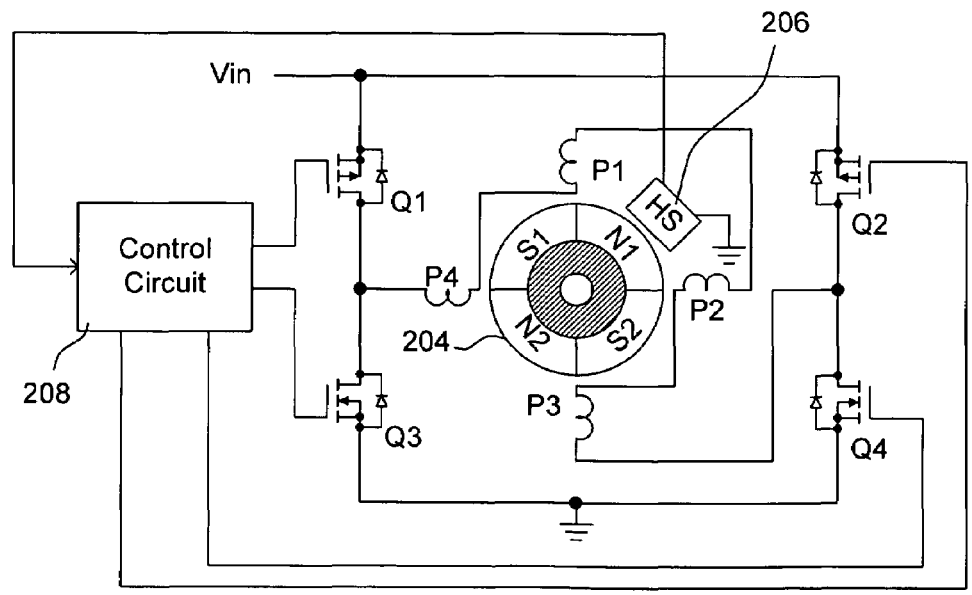
FIG. 2 is a circuit diagram of a single-coil BLDC motor, which uses a full-bridge circuit to drive the motor.
Figure 3:
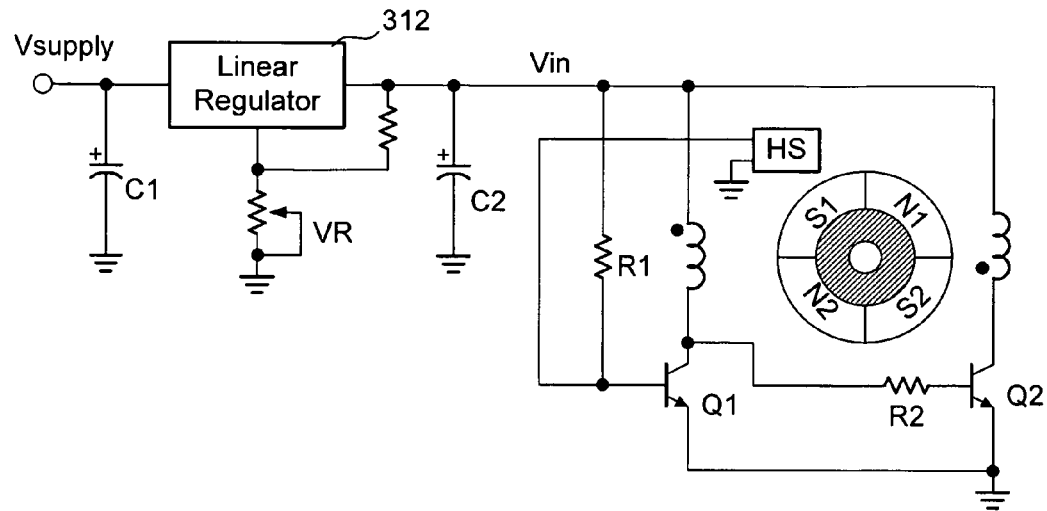
FIG. 3 is a circuit diagram of a conventional BLDC motor with speed control, which uses a linear regulator to control input voltage of the BLDC motor.
Figure 4:
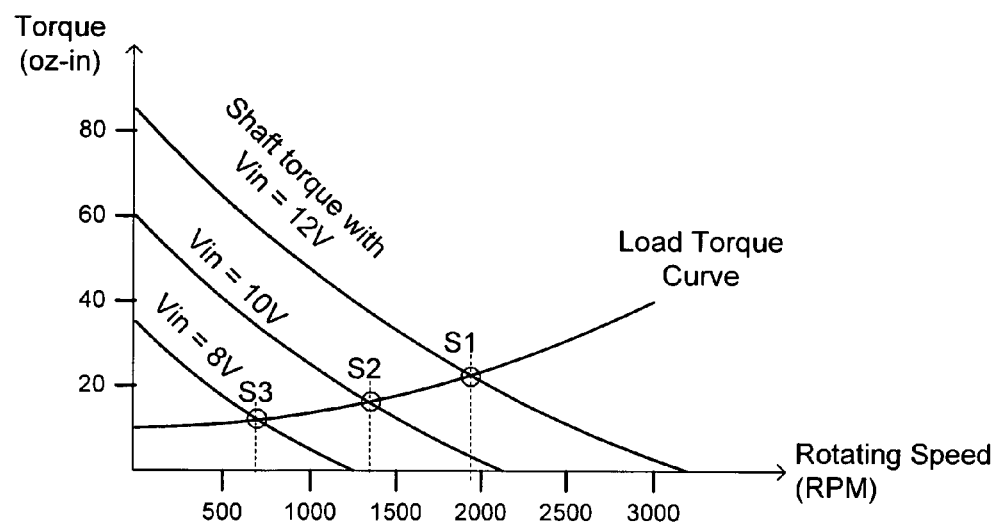
FIG. 4 is a diagram of the shaft torque lines versus rotating speed at different input voltage levels of 12V, 10V, and 8V, of the motor in FIG. 3.
Figure 5:
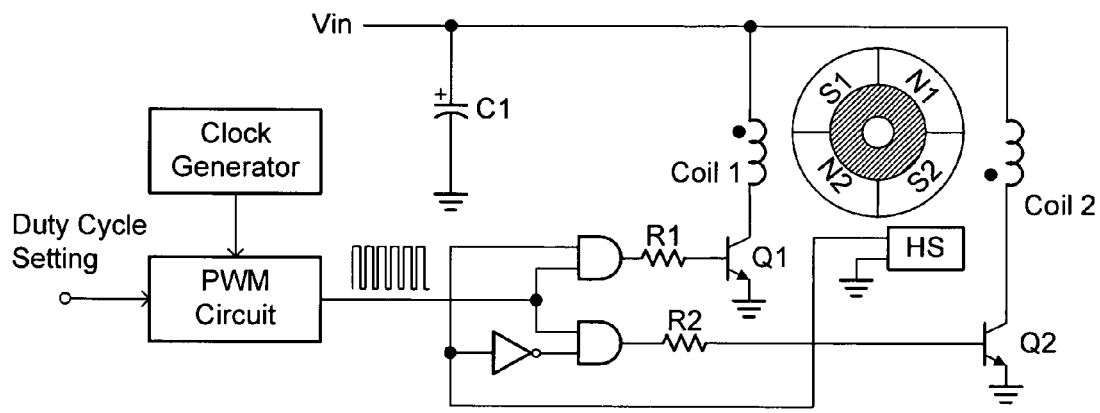
FIG. 5 is a circuit diagram of another conventional BLDC motor with speed control, which applies pulse-width modulation (PWM) to the base drive current.
Figure 6:
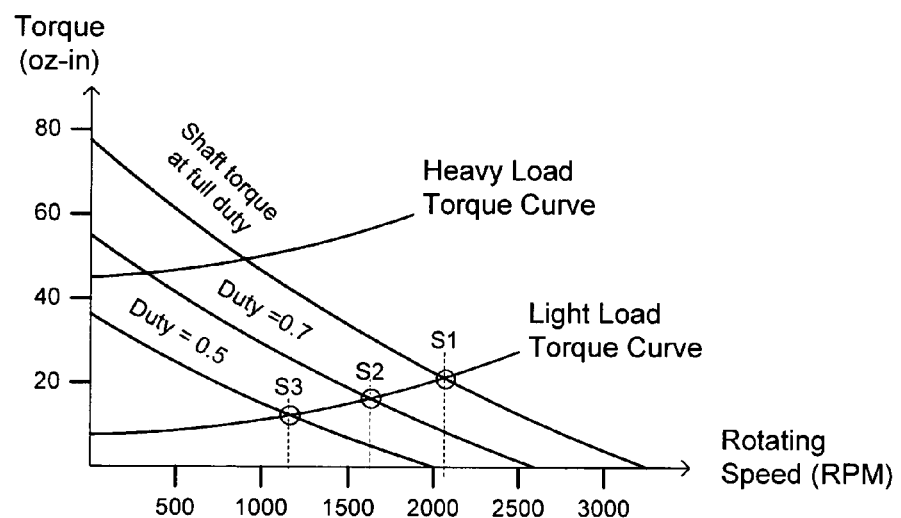
FIG. 6 is a diagram of the torque curves versus the rotating speed at different duty cycle values of 1.0, 0.7, and 0.5, of the motor in FIG. 5.
Figure 7:
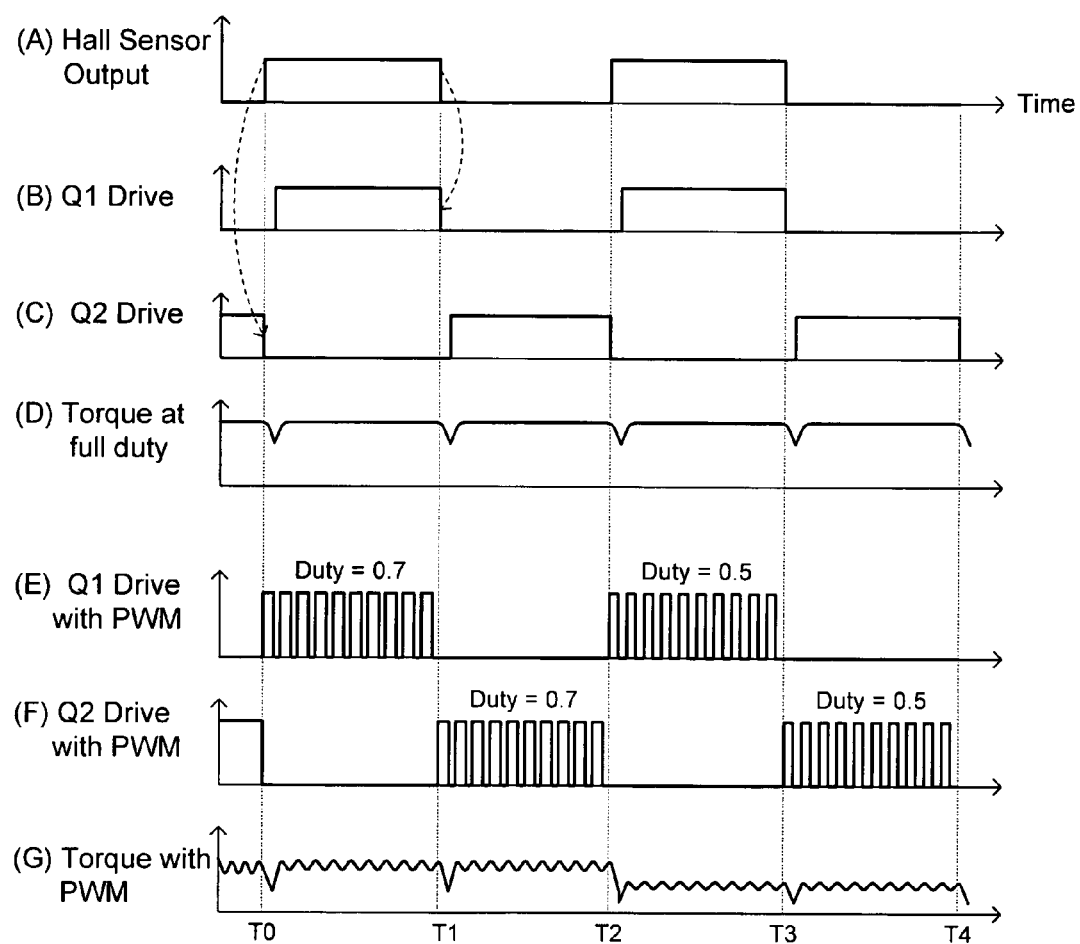
FIG. 7 illustrates the PWM control scheme waveforms of the motor in FIG. 6.

Reference will now be made in detail to the preferred embodiments of the present invention, examples of which are illustrated in the accompanying drawings. Wherever possible, the same reference numbers are used in the drawings and the description to refer to the same or like parts.

Figure 8:
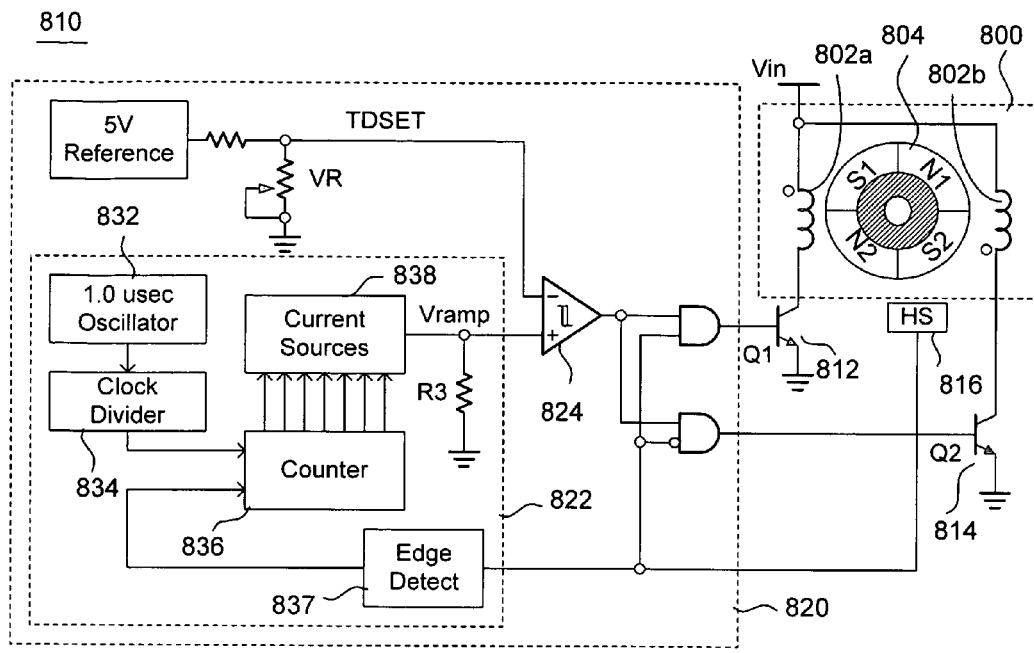
FIG. 8 is a circuit diagram of one preferred embodiment of the present invention.

FIG. 8 is a circuit diagram of one preferred embodiment of the present invention. Brushless DC (BLDC) motor 800 has a rotor 804 disposed within vertical stator poles and horizontal stator poles (not illustrated). The apparatus 810 for controlling the speed of BLDC motor 800 comprises a Hall sensor (HS) 816, a first switch 812, a second switch 814, and a turn-on delay control circuit 820. Hall sensor 816 detects a magnetic rotor section of rotor 804. First switch 812 produces magnetic north on the vertical stator poles and magnetic south on the horizontal stator poles of BLDC motor 800. Second switch 814 produces magnetic south on the vertical stator poles and magnetic north on the horizontal stator poles of BLDC motor 800.

Turn-on control circuit 820 comprises a voltage ramp circuit 822 and a comparator 824, and is used to generate a conduction time reduction after each output transition of Hall sensor 816. Voltage ramp circuit 822 is triggered to generate a ramp voltage (Vramp) by each output transition of Hall sensor 816 from a low logic level to a high logic level or from a high logic level to a low logic level. A non-inverting input of comparator 824 is electrically connected to the ramp voltage (Vramp), and an inverting input of comparator 824 is electrically connected to a reference voltage (TDSET). When the ramp voltage (Vramp) exceeds the reference voltage (TDSET), comparator 824 generates the conduction time reduction for alternately switching first switch 812 and second switch 814.

Moreover, Hall sensor 816 outputs the high logic level when Hall sensor 816 detects a proximity of the magnetic north rotor section (N), and outputs the low logic level when Hall sensor 816 detects a proximity of a magnetic south rotor section (S). First switch 812 applies voltage on a first phase winding 802a to produce magnetic north on the vertical stator poles and magnetic south on the horizontal stator poles. Second switch 814 applies voltage on a second phase winding 802b to produce magnetic south on the vertical stator poles and magnetic north on the horizontal stator poles.

When the output transition of Hall sensor 816 is from the low logic level to the high logic level, first switch 812 is turned on with a turn-on delay (Ton Delay) of the conduction time; and when the output transition of Hall sensor 816 is from the high logic level to the low logic level, second switch 814 is turned on with the turn-on delay of the conduction time. In addition, first switch 812 and second switch 814 in the preferred embodiment are power transistors Q1 and Q2, respectively.

More particularly, an on-chip oscillator 832 generates a 1.0 MHz (1.0 μsec) pulse. This 1 MHz pulse is divided by a clock circuit 834 to become a 2 kHz clock (0.5 msec pulses). A 7-bit binary counter 836 controlling an array of current sources 838 (1 μA, 2 μA, etc. to 64 μA), is driven by the 2 kHz clock. Binary counter 836 also resets and starts up its count whenever an edge-detect circuit 837 receives a rising edge or a falling edge from Hall sensor 816.

As binary counter 836 counts up, more current is applied to a summing resistor R (25 kΩ), and a voltage ramp, Vramp, is thus developed. Each count steps up the current by 1 μA, or 25 mV across the summing resistor R3. The maximum number of the count is 128, providing the ramp voltage (Vramp) of 3.2V. This corresponds to a maximum Ton delay of 64 msec according to the 2 kHz clock. On the other hand, a variable resistor, VR, sets a reference voltage (TDSET) for comparator 824 to determine the turn-on delay (Ton Delay). As illustrated in FIG. 8, after each signal edge of Hall sensor 816, the ramp voltage (Vramp) is reset to 0V and starts to ramp up by 25 mV per 0.5 msec step. Once the ramp voltage (Vramp) reaches the reference voltage (TDSET) set up by the variable resistor (VR), the output of comparator 824 goes from a low logic level to a high logic level, enabling power transistor Q1 or Q2 to be turned on.

Figure 9:
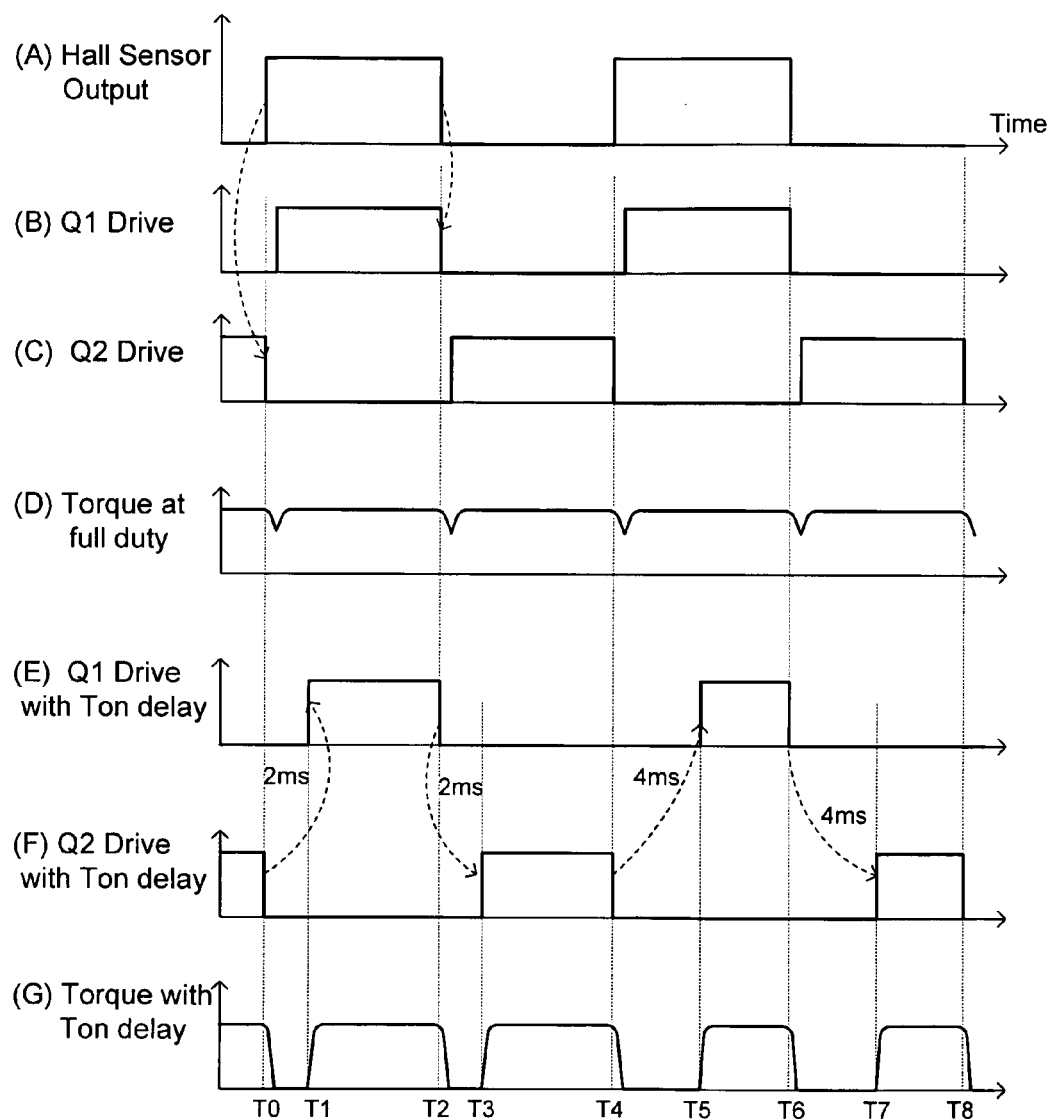
FIG. 9 illustrates the timings and waveforms of the speed control scheme with a constant turn-on delay.

FIG. 9 illustrates the timings and waveforms of the speed control scheme with a constant turn-on delay, made with references to FIG. 8. From time T0 to time T2, the turn-on time of power transistors Q1 and Q2 is each delayed by 2 msec. From time T4 to time T6, the turn-on time of power transistors Q1 and Q2 is each delayed by 4 msec. The resulting torque after a turn-on delay is illustrated in FIG. 9 (G).

Figure 10:
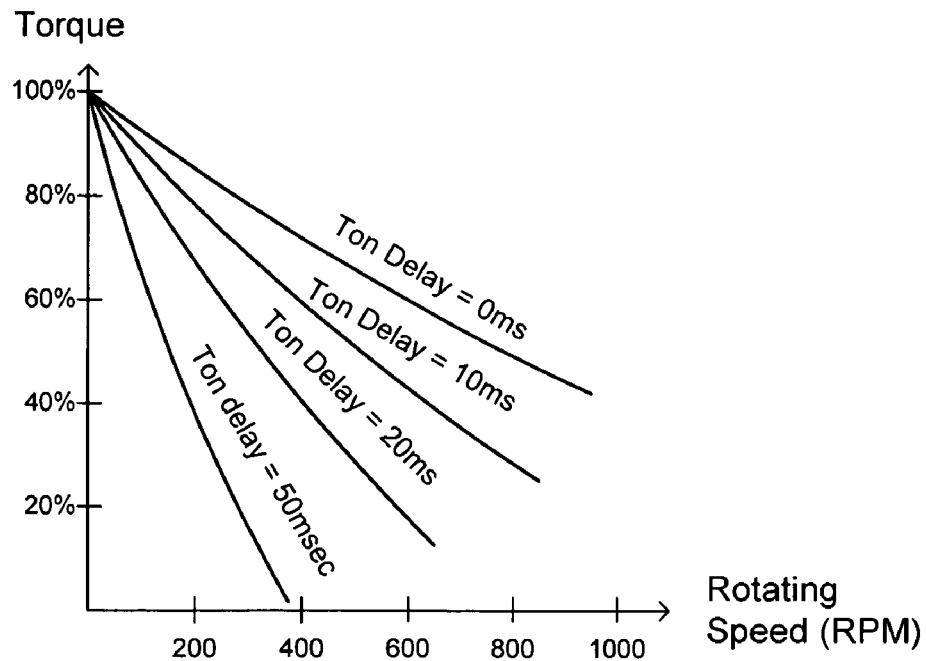
FIG. 10 is a diagram of the shaft torques at different turn-on (Ton) delay values.

FIG. 10 is a diagram of the shaft torques at different turn-on delay values. In principle, a constant turn-on delay scheme can be treated as an adaptive PWM speed control. However, the key difference is that the turn-on delay shaves off the shaft torque in a manner that shaft torque is attenuated proportional to the rotating speed of the motor. The higher speed the motor runs, the more shaft torque a constant turn-on delay shaves off.

For example, assume the input power Vin of the motor is 12V constant. For a given turn-on delay of 5 msec, the shaft torque is reduced by roughly 50% at high RPM (1200 RPM or 40 Hz for the Hall sensor), whereas the shaft torque is hardly reduced (less than 5%) at low speed (120 RPM or less). Similarly, for a 50 ms turn-on delay, the shaft torque at 300 RPM or higher speed is reduced to zero; but the shaft torque is hardly affected by a 50 ms turn-on delay at very low speed, such as less than 30 RPM.

Therefore, the adaptive torque shaving of the constant turn-on delay scheme offers two key advantages over the conventional PWM speed control scheme. First, the starting torque of the motor is virtually not affected at any turn-on delay setting. Second, the motor will not stall even if it experiences a sudden application of a heavy load.

Figure 11:
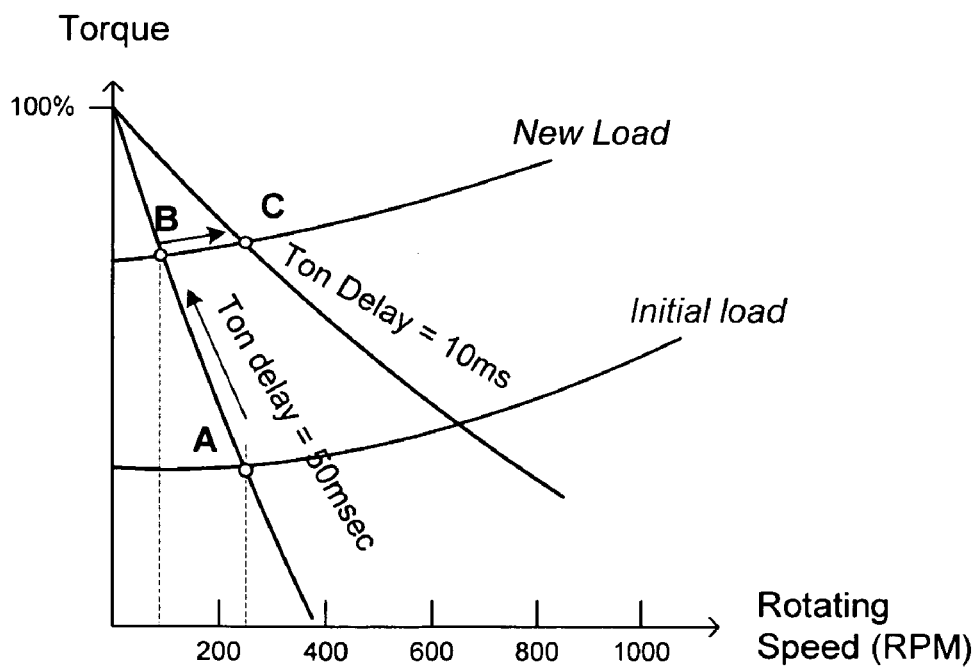
FIG. 11 is a diagram of the torque curves versus the rotating speed at different turn-on delays of 10 msec and 50 msec of the motor.

FIG. 11 is a diagram of the torque curves versus the rotating speed at different turn-on delays of 10 msec and 50 msec of the motor, showing the advantages of the turn-on delay scheme. The motor is running at low speed of 240 RPM (point A) for a light load initially. A sudden application of heavy load slows the motor down to 80 RPM (point B). Below 80 RPM, the 50 msec delay curve will provide more shaft torque than what the load demands. So even operating in an open-loop speed control as the embodiment illustrated in FIG. 8, the motor will never stall in the event of sudden application of a heavy load. Furthermore, if the motor is operated with a closed-loop speed control, the control circuit can adjust (shorten in this case) the turn-on delay to 10 msec in order to supply more shaft torque and bring the motor back to the 240 RPM regulation speed.

Another advantage of the preferred embodiment is that the drive circuit operates at exactly twice the motor rotating speed (due to a 4-pole motor structure). It mitigates high-frequency PWM creating audible noise or high-frequency switching loss and core loss of the conventional motorusing a PWM speed control.

It is noted that in a 4-pole BLDC motor, the rotating speed of the motor is related to the electrical frequency of the Hall sensor by the equation:

$$\text{Speed(in } RPM) = 60/(T*4)$$

where T is the duration for the Hall sensor to change state (i.e. from a rising edge to a falling edge or vice versa). For example, if T=50 msec, then the rotating speed of the motor is 300 RPM.

Figure 12:
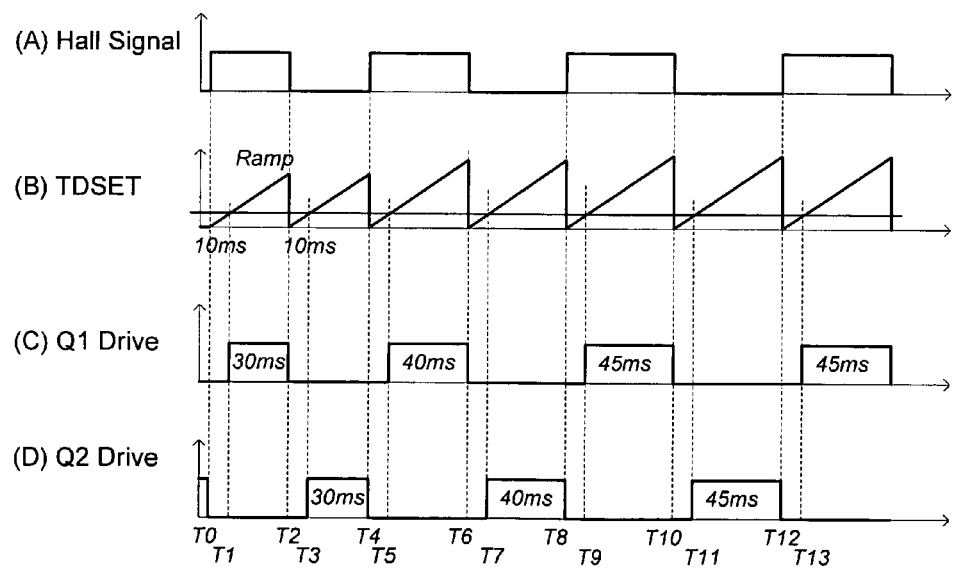
FIG. 12 illustrates the open-loop operation of the turn-on delay speed control scheme.

FIG. 12 illustrates the open-loop operation of the turn-on delay speed control scheme. A heavier load is suddenly applied to a motor running at a low speed (about 375 RPM) around time T4. The motor starts to slow down. While the turn-on delay remains at 10 msec, the cycle time increases from 40 msec to 50 msec, then to 55 msec (as the motor is slowing). At 55 msec cycle time, the shaft torque is increased sufficiently to keep the motor running at a new equilibrium speed (55 msec is equivalent to 273 RPM).

Figure 13:
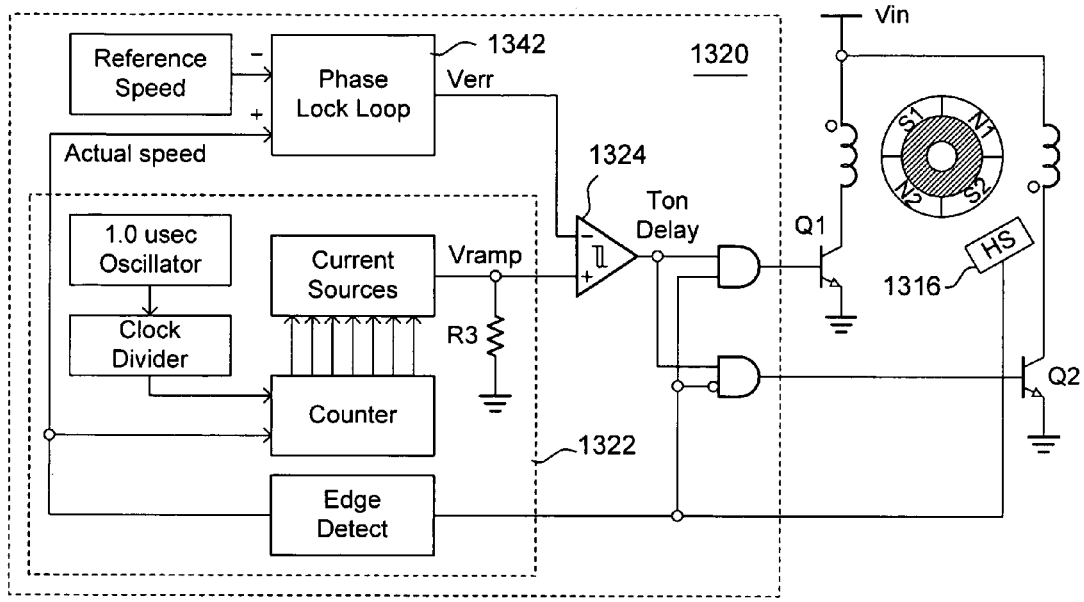
FIG. 13 is a circuit diagram of another preferred embodiment of the present invention, illustrating a closed-loop speed control scheme modified from the preferred embodiment in FIG. 8.

FIG. 13 is a circuit diagram of another preferred embodiment of the present invention, illustrating a closed-loop speed control scheme modified from the preferred embodiment in FIG. 8. A turn-on control circuit 1320 comprises a phase lock loop (PLL) circuit 1342, a voltage ramp circuit 1322 and a comparator 1324, and is used to generate a conduction time reduction after each output transition of Hall sensor 1316. A non-inverting input of phase lock loop circuit 1342 is electrically connected to an output of Hall sensor 1316, and an inverting input of phase lock loop circuit 1342 is electrically connected to a speed-setting reference voltage. The voltage ramp circuit 1322 is triggered to generate a ramp voltage (Vramp) by each output transition of Hall sensor 1316 from a low logic level to a high logic level or from the high logic level to the low logic level. A non-inverting input of comparator 1324 is electrically connected to the ramp voltage (Vramp), and an inverting input of comparator 1324 is electrically connected to an output of phase lock loop circuit 1342. Comparator 1324 produces the conduction time reduction in proportion to a difference between an actual speed of the motor and a reference speed set by the speed-setting reference voltage.

As illustrated in FIG. 13, a target speed (the reference speed) is compared with the actual speed derived from Hall sensor 1316 via phase lock loop (PLL) circuit 1342. PLL circuit 1342 thus generates an error voltage (Verr). If the actual speed is higher than the target speed (i.e. the reference speed), the error voltage (Verr) increases. The higher error voltage (Verr) increases the turn-on delay (Ton delay), thus slowing down the motor. On the other hand, if the actual speed is lower than the target speed (i.e. the reference speed), both the error voltage (Verr) and the turn-on delay (Ton delay) decrease, thus bringing up the rotating speed of the motor. With a proper loop gain, the rotating speed of the motor will be regulated to the reference speed setting.

Figure 14:
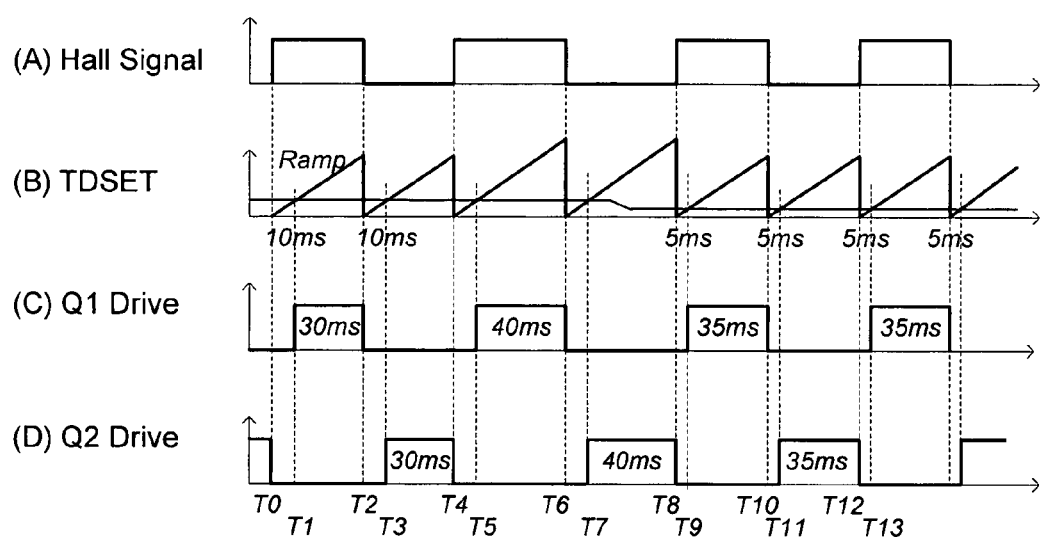
FIG. 14 illustrates the closed-loop operation of the turn-on delay speed control scheme, particularly a scenario when a load step happens in the closed-loop speed control scheme.

FIG. 14 illustrates the closed-loop operation of the turn-on delay speed control scheme, particularly a scenario when a load step happens in the closed-loop speed control scheme. Initially, the turn-on delay is set at 10 msec. The conduction time (Ton) of the power transistors Q1 and Q2 is reduced to 30 msec. The motor is initially running at 375 RPM. At time T4, the load increases suddenly. The speed of the motor slows down to 300 RPM for one electrical cycle. Assuming the closed-loop control reacts fast enough, it will reduce the turn-on delay (Ton) to 5 msec after T6, providing a higher input power and a higher shaft torque. The motor will then speed up to and resume the original speed of 375 RPM.

Figure 15:
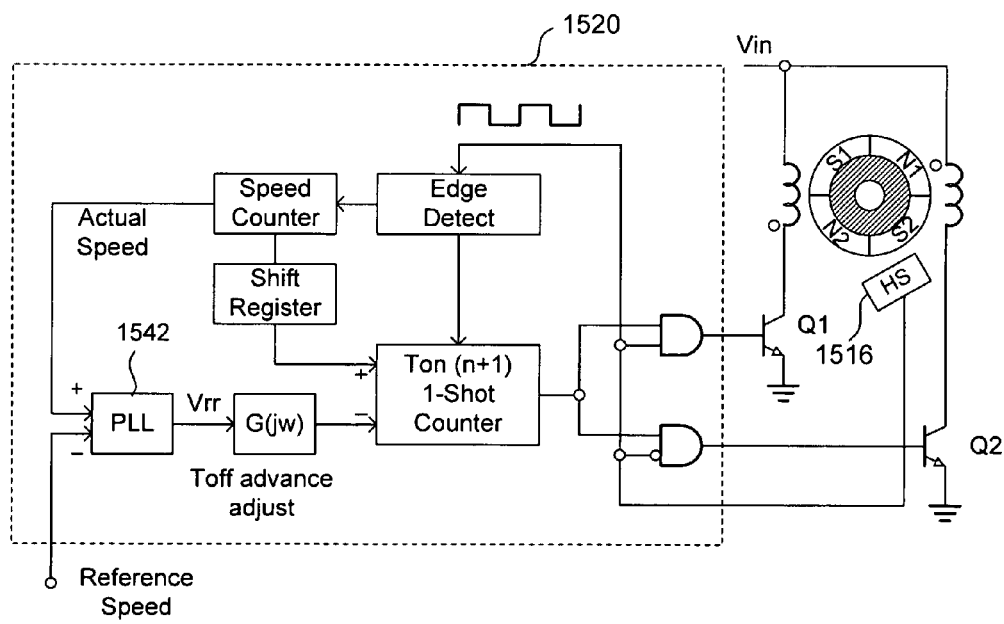
FIG. 15 illustrates a closed-loop operation of the turn-off advance speed control scheme.

The conduction time reduction (therefore the torque dropping) can be achieved in other manners. Compared with the manner of turn-on delay, a turn-off advance can also achieve the same result while improving the power factor and efficiency slightly. FIG. 15 illustrates a closed-loop operation of the turn-off advance speed control scheme.

Since Hall sensor 1516 provides the speed information of the motor, turn-on control circuit 1520 uses a digital circuit or a PLL circuit 1542 to calculate the actual speed of the motor. By comparing the actual speed to a reference speed, turn-on control circuit 1520 can derive an error voltage (Verr) that is proportional to a speed difference between the actual speed and the reference speed. This error voltage (Verr) can be used to adjust the conduction time reduction (the turn-on time (Ton) reduction) for the new cycle. If the actual speed is higher than reference speed, the error voltage (Verr) will be higher, forcing more turn-off advance (i.e. shorter conduction time), such that the shaft torque is reduced and the motor slows down. If the actual speed is lower than the reference speed, the error voltage (Verr) will be lower, forcing less turn-off advance (i.e. longer conduction time), such that the shaft torque is increased and the motor speeds up.

Figure 16:
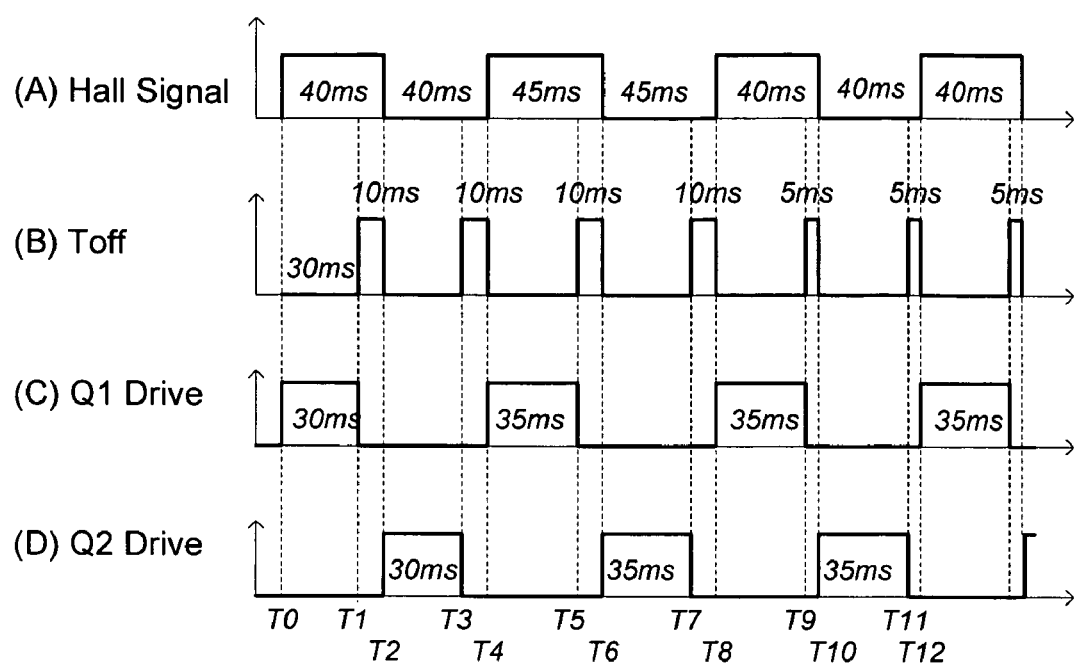
FIG. 16 illustrates the timings and waveforms of a speed control system based on a turn-off advance scheme.

FIG. 16 illustrates the timings and waveforms of a speed control system based on a turn-off advance scheme. Instead of reducing the conduction time at the front end, a turn-off advance speed control scheme reduces the conduction time at the trailing end. Initially, the motor is running at 375 RPM. A heavier load is suddenly applied around time T4, and the motor starts to slow down. While the turn-off advance remains at 10 msec, the cycle time increases from 40 msec to 45 msec. When the cycle time is 45 msec, the shaft torque is increased sufficiently to keep the motor running at a new equilibrium speed. Then the PLL circuit, due to detecting a slower speed, reduces the turn-off advance to 5 msec. The closed-loop speed control eventually brings the rotating speed of the motor back to 375 RPM.

Either the turn-on delay or the turn-off advance can achieve the same constant conduction time reduction. Therefore, they result in a similar torque shaving property. In summary, conduction time (turn-on time) reduction can be achieved via turn-on delay adjustment, or turn-off advance adjustment, or the combination of both, or other means of reducing the effective conduction time. The end result is to shape the shaft torque curves such that they will droop downward in proportion to the rotating speed of the motor.

Yet another alternative embodiment is to apply a pulse width modulation to the conduction time reduction. By this manner, the shaft torque will ramp up (or ramp down) gradually. The torque waveform behaves more like a trapezoidal waveform instead of a square waveform. In principle, this alternative embodiment can be treated as a combination of the turn-on delay and the PWM speed control schemes.

Figure 17:
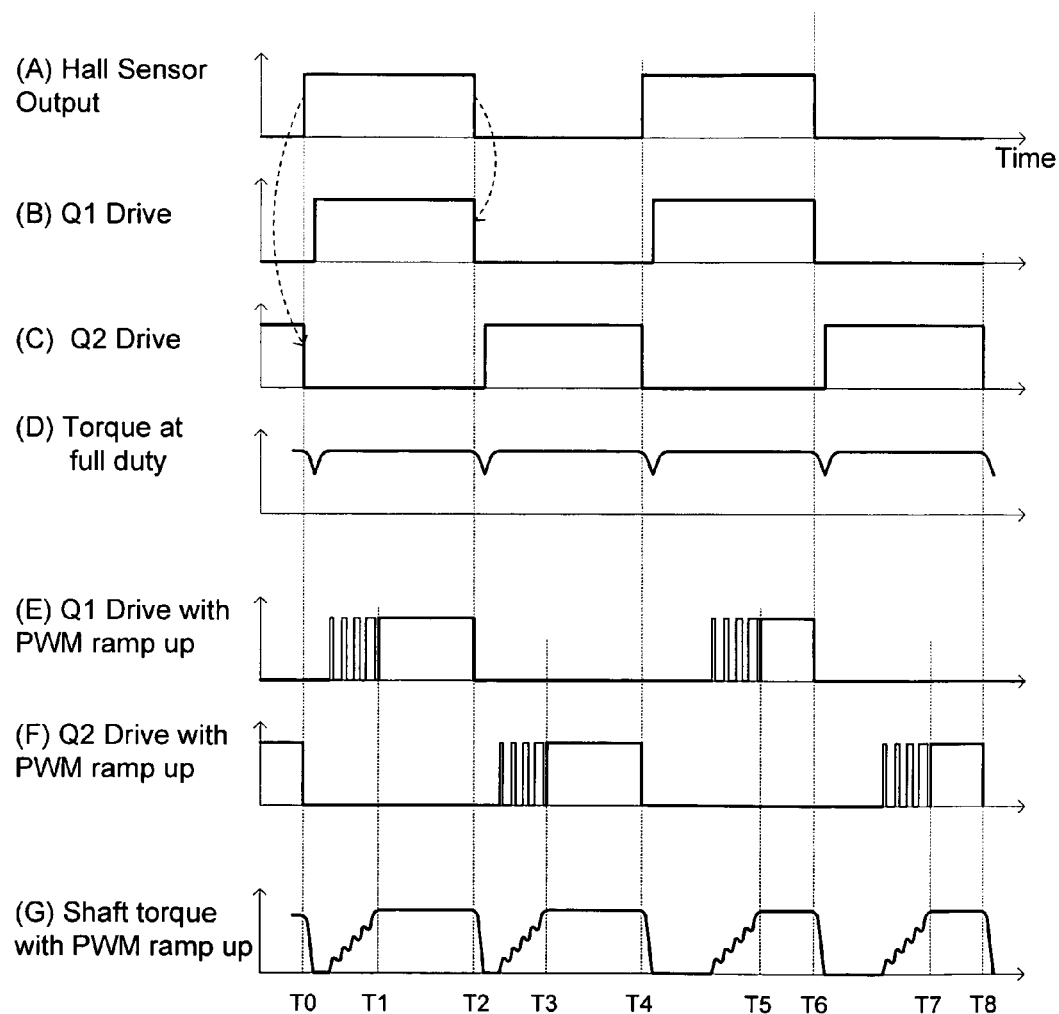
FIG. 17 illustrates the timings and waveforms of a speed control system based on the combination of the turn-on delay and the PWM speed control schemes.

FIG. 17 illustrates the timings and waveforms of a speed control system based on the combination of the turn-on delay and the PWM speed control schemes. During the cycle time of the power transistor Q1 (from time T0 to time T2), the conduction time is reduced by a total of 2 msec. During the cycle time of the power transistor Q2 (from time T2 to time T4), the conduction time is also reduced by a total of 2 msec. But during the next cycle time of the power transistor Q1 (from time T4 to time T6), the conduction time is reduced by a total of 4 msec. FIG. 17(G) illustrates the shaft torque waveform in a torque shaving speed control with a PWM ramp up scheme.

Figure 18:
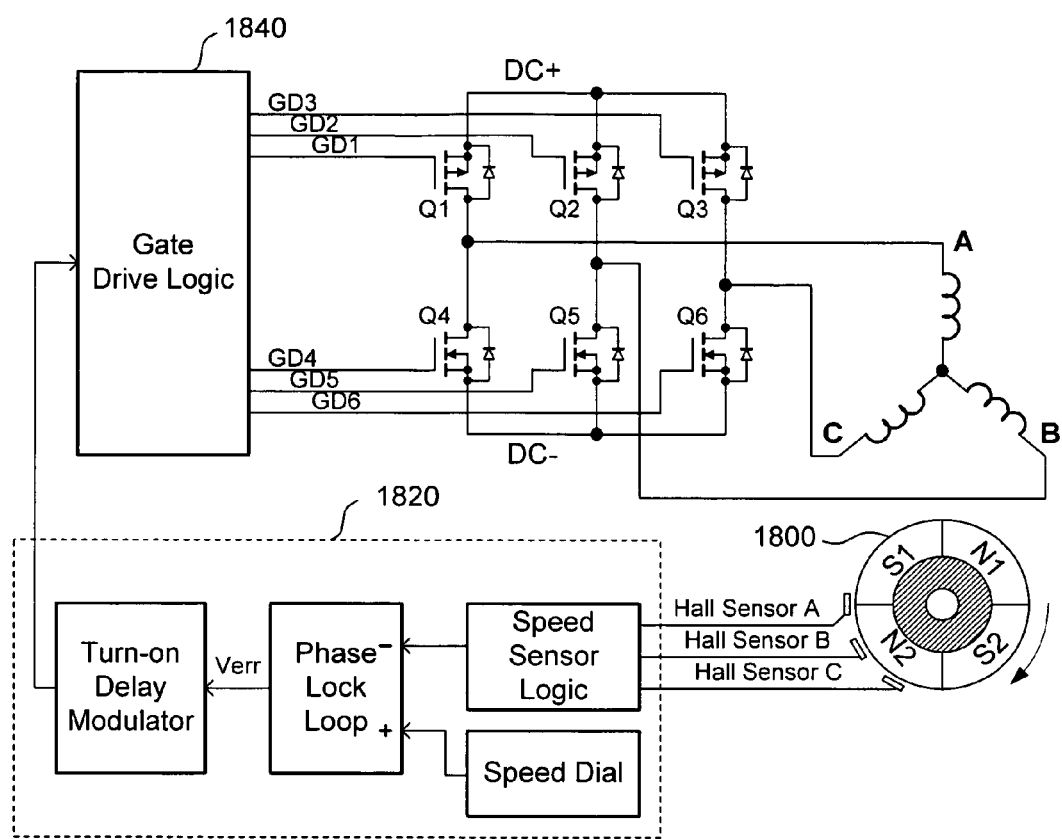
FIG. 18 is a block diagram of another preferred embodiment of the present invention, illustrating a 3-phase BLDC motor with the constant turn-on delay.

This same speed control via torque drooping can be applied to poly-phase BLDC motors as well, for example, 3-phase BLDC motors. FIG. 18 is a block diagram of another preferred embodiment of the present invention, illustrating a 3-phase BLDC motor with the constant turn-on delay.

As illustrated in FIG. 18, the apparatus for controlling the speed of the BLDC motor comprises a plurality of Hall sensors HS-A, HS-B, and HS-C, a plurality of switches (power transistors Q1, Q2, Q3, Q4, Q5, and Q6), a turn-on control circuit 1820, and a gate drive logic 1840. Hall sensors HS-A, HS-B, and HS-C are configured to detect magnetic rotor sections of a 3-phase BLDC motor 1800 by different positions. Switches, power transistors Q1, Q2, Q3, Q4, Q5, and Q6, apply voltages on a plurality of windings to respectively produce magnetic north or south on stator poles of the 3-phase BLDC motor 1800. Turn-on control circuit 1820 generates a conduction time reduction after each output transition of Hall sensors HS-A, HS-B, and HS-C. Gate drive logic 1840 separately turns on or turns off power transistors Q1, Q2, Q3, Q4, Q5, and Q6 according to different output transitions of Hall sensors HS-A, HS-B, and HS-C to respectively apply voltages on the windings with a turn-on delay of the conduction time reduction, a turn-off advance of the conduction time reduction, or a combination of turn-on delay and turn-off advance of the conduction time reduction.

More particularly, the stator of the 3-phase BLDC motor has a phase winding A, a phase winding B, and a phase winding C connected in a Y configuration. Three Hall sensors HS-A, HS-B, and HS-C are mounted at 30° angles from each other. Assuming the motor is designed to rotate clockwise, the three Hall sensors HS-A, HS-B, and HS-C can differentiate the rotor position up to 30° angular resolution. Table 1 lists a 6+1 steps speed control logic comprising different transitions of Hall sensors HS-A, HS-B, and HS-C, the corresponding activated switches, and the corresponding phase currents of the three phase windings.

TABLE 1

6 + 1 Steps speed control logic.

| STEP | HS-A | HS-B | HS-C | Activated Switches | | Phase Currents | | |
|------|------|------|------|------|------|------|------|------|
| | | | | | | A | B | C |
| I | 1 | 1 | 1 | Q1 | Q5 | DC+ | DC− | OFF |
| II | 1 | 1 | 0 | Q1 | Q6 | DC+ | OFF | DC− |
| III | 1 | 0 | 0 | Q2 | Q6 | OFF | DC+ | DC− |
| IV | 0 | 0 | 0 | Q2 | Q4 | DC− | DC+ | OFF |
| V | 0 | 0 | 1 | Q3 | Q4 | DC− | OFF | DC+ |
| VI | 0 | 1 | 1 | Q3 | Q5 | OFF | DC− | DC+ |
| O | Any Transition Edge | | | None | | OFF | OFF | OFF |

For example, at Step I, the magnetic north rotor section N1 of the motor engages with all three Hall sensors HS-A, HS-B, and HS-C, making HS-A=1, HS-B=1, HS-C=1. When the rotor spins 300 clockwise, it enters Step II, making HS-A=1, HS-B=1, HS-C=0. When the motor spins another more 300, it enters Step III, making HS-A=1, HS-B=0, HS-C=0; and so on as Table 1 lists.

There are six power transistors Q1, Q2, Q3, Q4, Q5, and Q6 in the 3-phase bridge drive circuit of the motor. Power transistors Q1, Q2, and Q3 separately connect DC+ (input voltage source) to the three phase windings; power transistors Q4, Q5, and Q6 separately connect the three phase windings to DC− (the ground). In steady-state operation, only one top power transistor and one bottom transistor are turned on at any one step.

The step sequence follows Step I (power transistors Q1 and Q5 are turned on), Step II (power transistors Q1 and Q6 are turned on), Step III (power transistors Q2 and Q6 are turned on), Step IV (power transistors Q2 and Q4 are turned on), Step V (power transistors Q3 and Q4 are turned on), and Step VI (power transistors Q3 and Q5 are turned on). When the rotor is in the position of Step I, power transistors Q1 and Q5 are turned on, and thus phase winding A is connected to DC+, whereas phase winding B is connected to DC−. Input current flows from DC+, into phase winding A, out of phase winding B, and returns to DC− via power transistor Q5. The magnetic field created by phase current A and phase current B points to the southeast direction in FIG. 18, repelling the section N1 and attracting the section S1 of the rotor. When the rotor spins 300 clockwise to the position of Step II, power transistors Q1 and Q6 are turned on. Input current flows from DC+, into phase winding A, out of phase winding C, and returns to DC− via power transistor Q5. The magnetic field created by phase current A and phase current B points to the southwest direction in FIG. 18.

Based on the relative position of the rotor sensed by the three Hall sensors HS-A, HS-B and HS-C, the turn-on control circuit can synchronize the proper phase current flow sequence, creating a rotating magnetic field always 90° in electrical angle ahead of the rotor.

Figure 19:
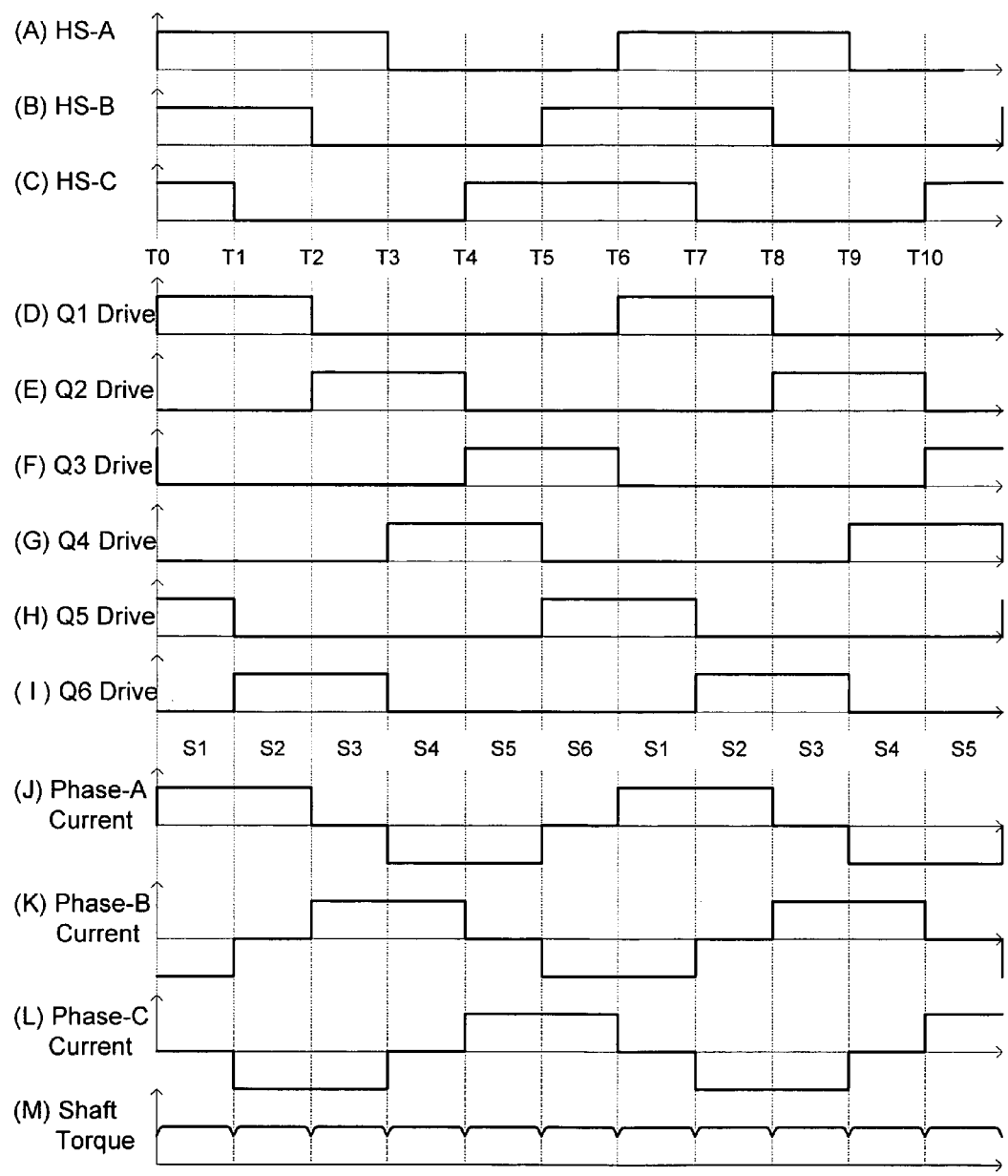
FIG. 19 illustrates the timings and waveforms of the power sequence of the three phase currents corresponding to the rotor position and the power sequence of the six power transistors of the bridge drive circuit.

FIG. 19 illustrates the timings and waveforms of the power sequence of the three phase currents corresponding to the rotor position and the power sequence of the six power transistors of the bridge drive circuit. The shaft torque waveform without any turn-on time delay is illustrated in FIG. 19(M).

Figure 20:
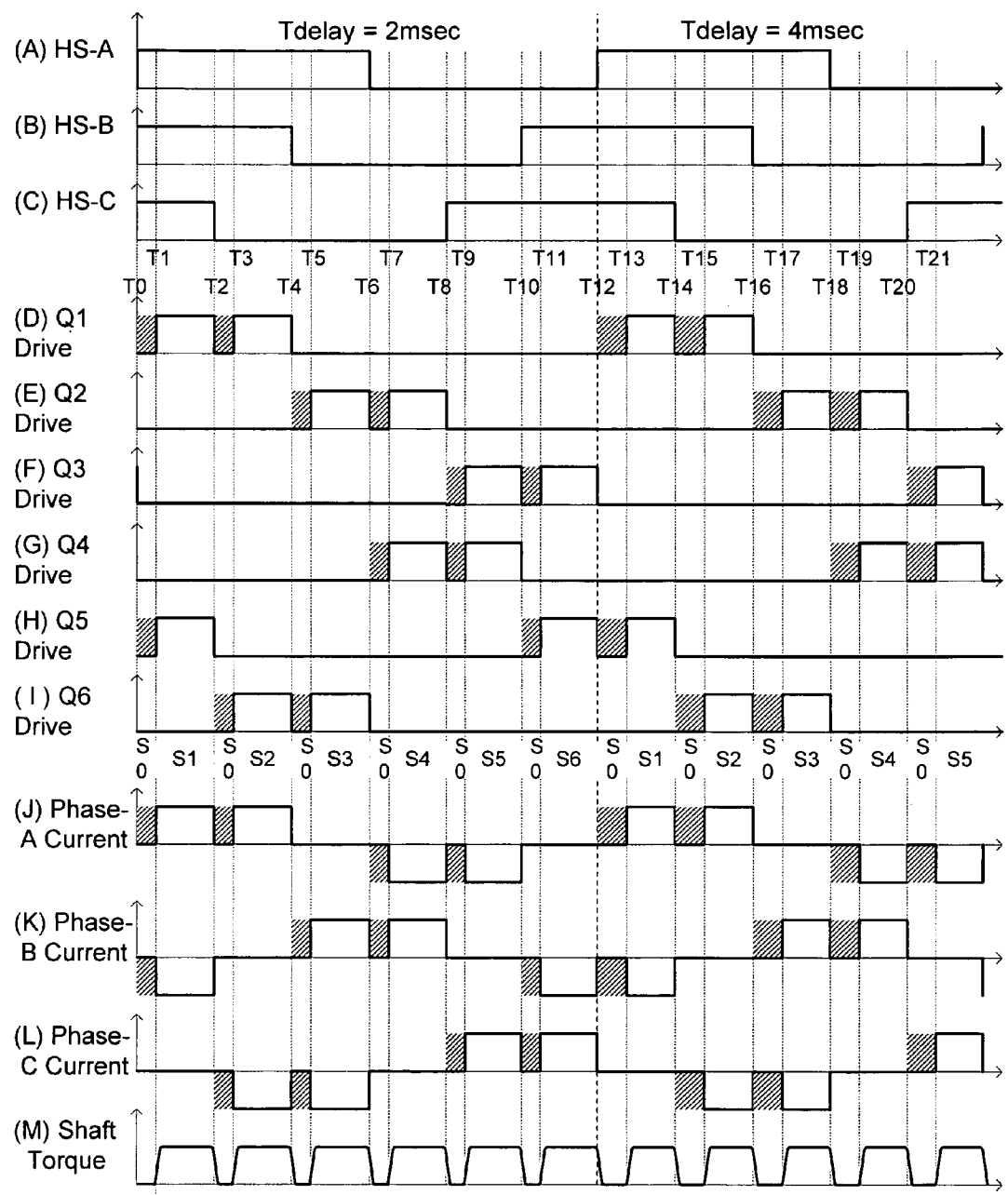
FIG. 20 illustrates the timings and waveforms of a speed control system based on a 6+1 steps speed control scheme.

The motor speed control of the preferred embodiment is achieved by adding a turn-on delay after each transition of the three Hall sensors HS-A, HS-B, and HS-C. FIG. 20 illustrates the timings and waveforms of a speed control system based on 6+1 steps speed control logic. For example, from time T0 to time T12, each step (I, II, III, IV, V, and VI) is preceded by an idle step O of 2 msec. In step O, all six transistors are turned off. The average shaft torque is reduced by about 25%. From time T12 to time T22, each step (I, II, III, IV, V, and VI) is preceded by another idle step O of 4 msec. The average shaft torque is reduced by about 37.5%.

In general, the motor speed control via a constant turn-on delay applying to a 3-phase BLDC motor works with the same operational principle of an adaptive torque shaving in a two-phase motor. At higher speed a greater portion of the shaft torque is shaved off; whereas at lower speed, a smaller portion of the shaft torque is shaved off. At really low speed, the shaft torque is reduced by a negligible portion. Consequently, the starting torque is not compromised at any finite constant turn-on delay, nor will the motor stall when a heavy load is applied to it suddenly.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for controlling the speed of a brushless DC motor, the apparatus comprising:

a Hall sensor arranged to output a high logic level when the Hall sensor detects a proximity of a magnetic north rotor section of the brushless DC motor, and output a low logic level when the Hall sensor detects a proximity of a magnetic south rotor section of the brushless DC motor;

a first switch arranged to apply voltage on a first winding to produce magnetic north on vertical stator poles of the brushless DC motor and magnetic south on horizontal stator poles of the brushless DC motor;

a second switch arranged to apply voltage on a second winding to produce magnetic south on the vertical stator poles and magnetic north on the horizontal stator poles;

a turn-on control circuit arranged to generate a conduction time reduction after each output transition of the Hall sensor;

wherein when the output transition of the Hall sensor is from the low logic level to the high logic level, the first switch is turned on to apply voltage on the first phase winding with a turn-on delay of the conduction time, a turn-off advance of the conduction time or a combination of turn-on delay and turn-off advance of the conduction time; and when the output transition of the Hall sensor is from the high logic level to the low logic level, the second switch is turned on to apply voltage on the second phase winding with the turn-on delay of the conduction time, the turn-off advance of the conduction time, or the combination of turn-on delay and turn-off advance of the conduction time.

2. The apparatus as claimed in claim 1, wherein the turn-on control circuit further comprises:
   a voltage ramp circuit triggered to generate a ramp voltage by each output transition of the Hall sensor from the low logic level to the high logic level or from the high logic level to the low logic level; and
   a comparator, a non-inverting input of the comparator being electrically connected to the ramp voltage, an inverting input of the comparator being electrically connected to a reference voltage, and wherein when the ramp voltage exceeds the reference voltage, the comparator is arranged to generate the conduction time reduction for alternately switching the first switch and the second switch.

3. The apparatus as claimed in claim 1, wherein the turn-on control circuit further comprises:
   a phase lock loop circuit, a non-inverting input of the phase lock loop circuit being electrically connected to an output of the Hall sensor, an inverting input of the phase lock loop circuit being electrically connected to a speed-setting reference voltage;
   a voltage ramp circuit triggered to generate a ramp voltage by each output transition of the Hall sensor from the low logic level to the high logic level or from the high logic level to the low logic level; and
   a comparator, a non-inverting input of the comparator being electrically connected to the ramp voltage, an inverting input of the comparator being electrically connected to an output of the phase lock loop circuit, wherein the comparator is arranged to produce the conduction time reduction in proportion to a difference between an actual rotor speed and a reference speed set by the speed-setting reference voltage.

4. The apparatus as claimed in claim 1, wherein the first switch and the second switch are power transistors.

5. The apparatus as claimed in claim 1, wherein the turn-on delay or the turn-off advance is ramped.

6. An apparatus for controlling the speed of a brushless DC motor, the brushless DC motor having a rotor disposed within vertical stator poles and horizontal stator poles, the apparatus comprising:
   a Hall sensor arranged to detect a magnetic rotor section of the rotor;
   a first switch arranged to produce magnetic north on the vertical stator poles and magnetic south on the horizontal stator poles;
   a second switch arranged to produce magnetic south on the vertical stator poles and magnetic north on the horizontal stator poles; and
   a turn-on control circuit arranged to generate a conduction time reduction after each output transition of the Hall sensor, wherein the turn-on control circuit comprises:
      a voltage ramp circuit triggered to generate a ramp voltage by each output transition of the Hall sensor from a low logic level to a high logic level or from the high logic level to the low logic level; and
      a comparator, a non-inverting input of the comparator being electrically connected to the ramp voltage, an inverting input of the comparator being electrically connected to a reference voltage, and wherein when the ramp voltage exceeds the reference voltage, the comparator is arranged to generate the conduction time reduction for alternately switching the first switch and the second switch.

7. The apparatus as claimed in claim 6, wherein the Hall sensor is arranged to output the high logic level when the Hall sensor detects a proximity of a magnetic north rotor section, and output the low logic level when the Hall sensor detects a proximity of a magnetic south rotor section.

8. The apparatus as claimed in claim 6, wherein the first switch is arranged to apply voltage on a first phase winding to produce magnetic north on the vertical stator poles and magnetic south on the horizontal stator poles, and the second switch is arranged to apply voltage on a second phase winding to produce magnetic south on the vertical stator poles and magnetic north on the horizontal stator poles.

9. The apparatus as claimed in claim 6, wherein when the output transition of the Hall sensor is from the low logic level to the high logic level, the first switch is turned on with a turn-on delay of the conduction time, a turn-off advance of the conduction time or a combination of turn-on delay and turn-off advance of the conduction time; and
   when the output transition of the Hall sensor is from the high logic level to the low logic level, the second switch is turned on with the turn-on delay of the conduction time, the turn-off advance of the conduction time, or the combination of turn-on delay and turn-off advance of the conduction time.

10. The apparatus as claimed in claim 6, wherein the first switch and the second switch are power transistors.

11. The apparatus as claimed in claim 6, wherein the turn-on delay or the turn-off advance is ramped.

12. An apparatus for controlling the speed of a brushless DC motor, the brushless DC motor having a rotor disposed within vertical stator poles and horizontal stator poles, the apparatus comprising:
   a Hall sensor arranged to detect a magnetic rotor section of the rotor;
   a first switch arranged to produce magnetic north on the vertical stator poles and magnetic south on the horizontal stator poles;
   a second switch arranged to produce magnetic south on the vertical stator poles and magnetic south on the horizontal stator poles; and
   a turn-on control circuit arranged to generate a conduction time reduction after each output transition of the Hall sensor, wherein the turn-on control circuit comprises:
      a phase lock loop circuit, a non-inverting input of the phase lock loop circuit being electrically connected to an output of the Hall sensor, an inverting input of the phase lock loop circuit being electrically connected to a speed-setting reference voltage;
      a voltage ramp circuit triggered to generate a ramp voltage by each output transition of the Hall sensor from a low logic level to a high logic level or from the high logic level to the low logic level; and
      a comparator, a non-inverting input of the comparator being electrically connected to the ramp voltage, an inverting input of the comparator being electrically connected to an output of the phase lock loop circuit, wherein the comparator is arranged to produce the conduction time reduction in proportion to a difference between an actual speed of the motor and a reference speed set by the speed-setting reference voltage.

13. The apparatus as claimed in claim 12, wherein the Hall sensor is arranged to output the high logic level when the Hall sensor detects a proximity of a magnetic north rotor section, and output the low logic level when the Hall sensor detects a proximity of a magnetic south rotor section.

14. The apparatus as claimed in claim 12, wherein the first switch is arranged to apply voltage on a first phase winding to produce magnetic north on the vertical stator poles and magnetic south on the horizontal stator poles, and the second switch is arranged to apply voltage on a second phase winding to produce magnetic south on the vertical stator poles and magnetic north on the horizontal stator poles.

15. The apparatus as claimed in claim 12, wherein when the output transition of the Hall sensor is from the low logic level to the high logic level, the first switch is turned on with a turn-on delay of the conduction time, a turn-off advance of the conduction time or a combination of turn-on delay and turn-off advance of the conduction time; and when the output transition of the Hall sensor is from the high logic level to the low logic level, the second switch is turned on with the turn-on delay of the conduction time, the turn-off advance of the conduction time, or the combination of turn-on delay and turn-off advance of the conduction time.

16. The apparatus as claimed in claim 12, wherein the first switch and the second switch are power transistors.

17. The apparatus as claimed in claim 12, wherein the turn-on delay or the turn-off advance is ramped.

18. An apparatus for controlling the speed of a poly-phase brushless DC motor, the apparatus comprising:
a plurality of Hall sensors configured to detect magnetic rotor sections of the poly-phase brushless DC motor at different positions;
a plurality of switches arranged to apply voltages on a plurality of windings to respectively produce magnetic north or south on stator poles of the poly-phase brushless DC motor;
a turn-on control circuit arranged to generate a conduction time reduction after each output transition of the Hall sensors;
a gate drive logic, arranged to separately turn on or turn off the switches according to different output state transitions of the Hall sensors to respectively apply voltages on the windings with a turn-on delay of the conduction time, a turn-off advance of the conduction time, or a combination of turn-on delay and turn-off advance of the conduction time.

19. The apparatus as claimed in claim 18, wherein each of the Hall sensors is arranged to output a high logic level when the Hall sensor detects a proximity of a magnetic north rotor section, and output a low logic level when the Hall sensor detects a proximity of a magnetic south rotor section.

20. The apparatus as claimed in claim 18, wherein the turn-on control circuit further comprises:
a voltage ramp circuit triggered to generate a ramp voltage by each output transition of the Hall sensors; and
a comparator, a non-inverting input of the comparator being electrically connected to the ramp voltage, an inverting input of the comparator being electrically connected to a reference voltage, and wherein when the ramp voltage exceeds the reference voltage, the comparator is arranged to generate the conduction time reduction for respectively switching the switches.

21. The apparatus as claimed in claim 18, further comprising:
a phase lock loop circuit, a non-inverting input of the phase lock loop circuit being electrically connected to outputs of the Hall sensors, an inverting input of the phase lock loop circuit being electrically connected to a speed-setting reference voltage; and
the turn-on control circuit further comprises:
a voltage ramp circuit triggered to generate a ramp voltage by each output transition of the Hall sensors; and
a comparator, a non-inverting of the comparator being electrically connected to the ramp voltage, an inverting input of the comparator being electrically connected to an output of the phase lock loop circuit, wherein the comparator is arranged to produce the conduction time reduction in proportion to a difference between an actual rotor speed and a reference speed set by the speed-setting reference voltage.

22. The apparatus as claimed in claim 18, wherein the switches are power transistors.

23. The apparatus as claimed in claim 18, wherein the turn-on delay or the turn-off advance is ramped.

* * * * *